Aug. 23, 1927.
E. P. LOCKE
WINDOW WIPER
Filed July 23, 1926
1,639,778
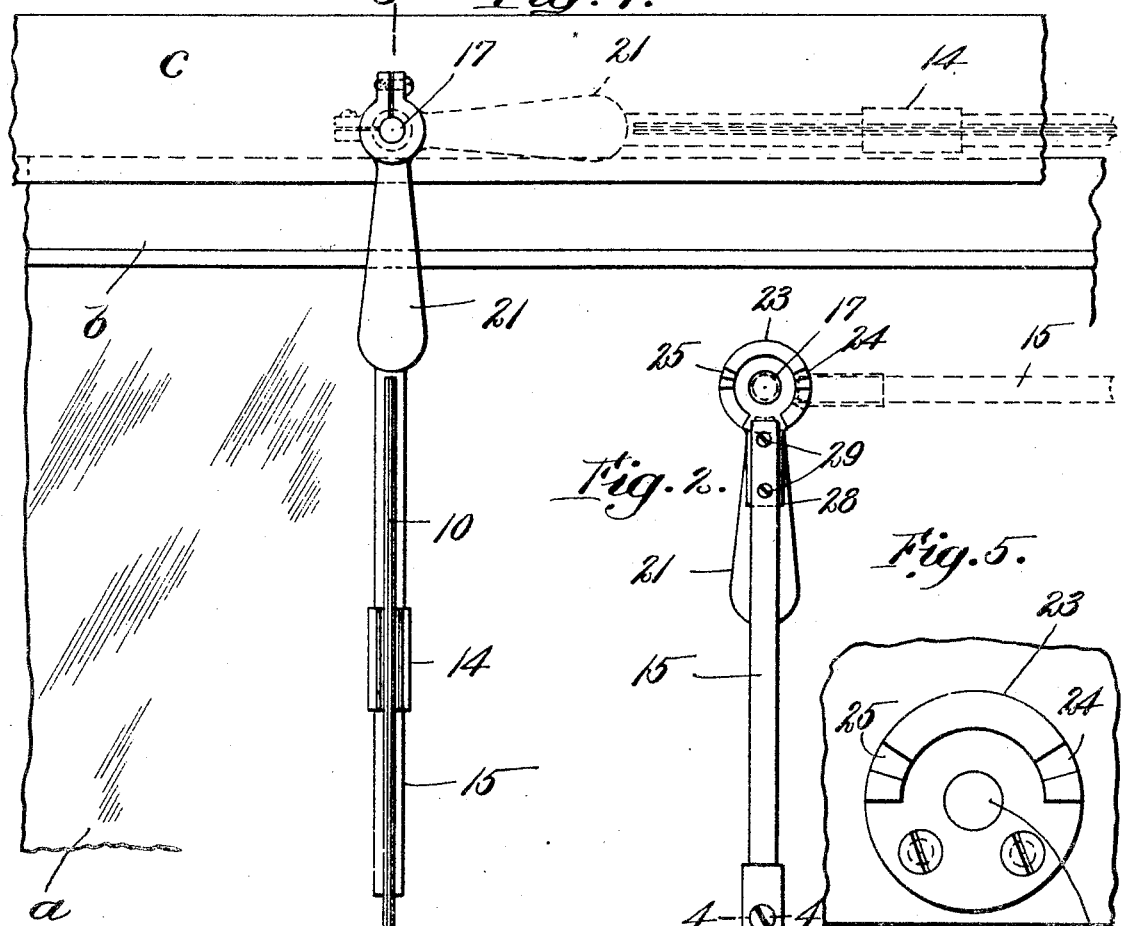
Inventor:
Ernest P. Locke
by Jas. H. Churchill
atty.

Patented Aug. 23, 1927.

1,639,778

UNITED STATES PATENT OFFICE.

ERNEST P. LOCKE, OF BOSTON, MASSACHUSETTS.

WINDOW WIPER.

Application filed July 23, 1926. Serial No. 124,376.

This invention relates to a window wiper and particularly to a wiper for the windows of electric railway cars, automobiles and like vehicles.

Devices of this character as now commonly constructed and known to me, are provided with a rotatable wiping member which engages the glass of the window and which when not in use remains in contact with the glass and more or less obstructs the view of the operator of the vehicle.

The present invention has for its object to provide a window wiper in which the wiping member is capable of being moved into a position in which it does not obstruct the view of the operator and which can be locked or held in such position at the will of the operator.

To this end, the window-wiping member is mounted so as to be capable of being moved into a position out of line with the glass and has co-operating with it a device for holding or locking it in such position subject to the will of the operator.

The invention further has for its object to provide for automatically locking the wiping member in what may be termed its inoperative position.

These and other features of the invention will be pointed out in the claim at the end of this specification.

Fig. 1 represents a portion of the front window of the vestibule of an electric railway car provided with a wiper embodying this invention;

Fig. 2, an elevation of the wiper shown in Fig. 1, looking from the outside of the car and showing one form of locking device for the wiping member;

Fig. 3, a vertical section on the line 3—3, Fig. 1;

Fig. 4, a detail in section on the line 4—4, Fig. 2;

Figs. 5 and 6, details in elevation of the locking member for the wiping member.

Referring to the drawing, a represents the glass and b the sash of the front window of the vestibule of an electric car, represented by the frame c for the window sash b. The glass a has co-operating with it a wiper therefor, which may and preferably will be of the construction herein shown, and consists of a wiping member 10 of rubber or other suitable material carried by a metal clip 12 which is secured by a pin 13 or otherwise to a holder 14 adjustably mounted on an arm 15 and secured thereon in its adjusted position by a set screw 16 or otherwise.

The arm 15 is secured to a rock-shaft 17 mounted in a sleeve or hub 18 extended in the present instance through the top horizontal portion or member 19 of the window casing or frame c.

The rock-shaft 17 is rotatable in the hub 18 and is also capable of movement axially thereof, and is made of sufficient length to extend into the vestibule a sufficient distance to enable it to be manipulated from within the vehicle under all conditions of use.

In the present instance, the rock-shaft has fast on its end within the vehicle a handle 21, by means of which the shaft 17 may be rocked by the motorman or other operator, when the wiper member 10 is in its operative position in contact with the outer surface of the glass, as shown in Fig. 3, and by means of which the shaft 17 may be bodily moved axially of the hub or sleeve 18 to enable the wiping member to be moved into its inoperative position out of contact with the glass and out of line therewith, as indicated by dotted lines in Fig. 1, so as to leave the view of the operator clear and unobstructed by the wiping member.

Provision is made for locking or holding the wiper member in its inoperative position, and in the present instance one construction or arrangement is provided for this purpose.

To this end, the hub 18 has attached to its outer end a plate 22 provided with a substantially semicircular flange 23 having near its opposite ends notches or recesses 24, 25 (see Fig. 5), with which co-operate lugs 26, 27 (see Fig. 6) on a crank or arm 28 on the shaft 17 to which the wiper-carrying arm 15 is detachably secured by screws 29.

It may be preferred to make the arm 15 separate from the crank or arm 28 as herein shown, but they may be made in one piece if desired.

One of the lugs as 26 is designed to be entered into one of the recesses as 25 when the rock-shaft 17 is turned in one direction, and the other lug 27 is designed to be entered into the other recess 24 when the rock-shaft 17 is turned in the opposite direction, from a position with the wiper-carrying arm 15 occupying a vertical position as shown by full lines in Fig. 1.

Each lug and its co-operating recess constitutes one form of locking device for the wiping member in its inoperative position, and by providing two locking devices, the wiper may be turned either to the right or to the left from its vertical position.

In the present instance, the lug 27 co-operates with the recess 28 to lock the wiper member in its inoperative position, indicated by dotted lines in Fig. 1, and when the wiper is turned in the opposite direction into its inoperative position, the lug 26 co-operates with the recess 24.

It will be observed that when the wiper member is locked in its inoperative position, it is above the glass $a$ of the window and therefore out of line with said glass, and consequently out of the field of vision of the motorman, who has an unobstructed view through the glass. The rock-shaft 17 may be moved axially in opposite directions by the motorman by means of the handle 21, but it is preferred to automatically move the shaft inwardly into the car. To this end, a spring 30 is mounted upon the shaft 17 between the handle 21 and the inner end of the sleeve or hub 18, which spring is in its extended position as shown in Fig. 3 when the wiper member 10 is in its operative position in engagement with the outside of the glass, in which position it can be oscillated to clean the glass on the outside by the motorman turning the handle in opposite directions.

When it is desired to remove the wiper from the view of the motorman, as in clear weather, the motorman by means of the handle 21 moves the rock-shaft 17 axially and outwardly until the wiper member 10 is beyond the plane in which the outer surface of the window casing $c$ is located, and when the wiper member is in this position, the handle is turned by the motorman so as to rock the shaft 17 until the wiper member has been brought in front of the window casing as represented by dotted lines in Fig. 1.

When the wiper member has been brought into its inoperative or concealed position, it is automatically locked therein by the spring 30 which is compressed on the outward movement of the shaft, and is partially expanded when one of the locking lugs 26, 27 is brought into line with its co-operating notch or recess 24 or 25, and enters the lug in said recess.

When it is desired to restore the wiping member to its operative position, the motorman pushes upon the handle to move the shaft 17 outwardly so as to withdraw the locking lug from its co-operating notch or recess in the flange 23, and then turns the handle downward so as to bring the locking lug out of line with the said flange, which permits the spring 30 to automatically move the shaft 17 inwardly until the wiping member engages the outside of the glass.

In the present instance, the rock-shaft 17 is mounted in the casing or frame $c$, but it is not desired to limit the invention in this respect, as the wiper can be applied to the window by mounting the rock-shaft in the window sash $b$, so as to be concealed thereby when in its inoperative position.

By reference to Fig. 3, it will be observed that when the wiper is in its operative position, the flange 23 projects materially beyond the outer end of the wiper and functions as a hood to protect the rock-shaft from snow and sleet in the winter time, and if desired a similar hood may be provided on the casing or window frame for the wiping member in its inoperative position.

One embodiment of the invention is herein shown, but it is not desired to limit the invention to the particular construction shown.

While I have herein described the invention as applied to an electric car, it is equally applicable to automobiles or like vehicles.

What I claim is:

A window wiper comprising a wiping member for engaging the glass of a window, a shaft to which said wiping member is secured, a hub through which said shaft is extended and in which it is capable of rotary and axial movements, a plate attached to said hub and provided with a substantially semicircular flange having a notch, and a lug attached to and movable with the wiping member and adapted to enter said notch when the said shaft is moved axially and rotated to thereby lock the latter against rotation.

In testimony whereof, I have signed my name to this specification.

ERNEST P. LOCKE.